United States Patent Office 3,591,515
Patented July 6, 1971

3,591,515
PULVERULENT CHLORINE DIOXIDE COMPOSITIONS
Clement F. Lovely, Butler, N.J., assignor to International Dioxide, Inc., New York, N.Y.
No Drawing. Filed Apr. 16, 1968, Ser. No. 721,572
Int. Cl. A61l 13/00
U.S. Cl. 252—187                                    8 Claims

ABSTRACT OF THE DISCLOSURE

Substantially dry pulverulent solid compositions are provided which comprise an effective amount of chlorine dioxide solutions, such as the chlorine dioxide solutions stabilized with peroxy and percarbonate compounds, or a like solution such as the alkaline chlorite solutions, adsorbed on a basic-reacting adsorbent, such as synthetic calcium silicate. These compositions will yield gaseous chlorine dioxide upon acidification to a pH of less than about 6. Preferred acidifying agents include powdered hydrated citric acid or dry acid reacting adsorbents such as silicates having an aqueous solution of an acidic compound, such as ferric chloride or sulfuric acid, adsorbed thereon. The compositions can be used for the preservation of fruits and vegetables being shipped or stored.

BACKGROUND OF THE INVENTION

Chlorine dioxide is well known as a strong oxidizing agent. The use of chlorine dioxide for disinfecting and other allied uses, including that of algicide, fungicide, germicide, bactericide, deodorant, bleach and other general sterilizing and antiseptic purposes is known.

However, chlorine dioxide is a hazardous material to handle, unstable, and generally difficult to produce and to apply where needed. As a result of the indicated difficulties, chlorine dioxide often is prepared at the place of use, and is immediately used. Since the cost of chlorine dioxide gas generating units useful for this purpose can be considerable, and may require trained personnel, the use of chlorine dioxide has been limited. Accordingly, there has existed a need for a means of making chlorine dioxide in stored form but available readily and safely.

Stabilized solutions of chlorine dioxide in water and in carbon tetrachloride have been proposed for this purpose. For example, Pat. No. 3,123,521 discloses aqueous solutions of chlorine dioxide which have been stabilized with sodium carbonate peroxide which yield chlorine dioxide upon acidification. It is also known that in acid aqueous solutions the chlorites of the alkali and alkaline earth metals decompose to a certain extent to form chlorine dioxide. Pat. No. 2,071,091, for example, discloses these aqueous solutions. However, in some applications such as the preservation of plants and plant parts against fungus decay, such liquid compositions have been disadvantageous because of the difficulty of application and possible inherent danger because of the high concentration of chlorine dioxide.

Chlorine dioxide compositions in powder form can solve many of the above mentioned problems. However, previous pulverulent compositions must be water-activated. That is, the powder, briquette, or tablet, such as those described in patents numbered 2,071,094 and 3,271,242, must be contacted with water to initiate the chlorine dioxide-yielding reaction. This necessary step effectively limits these known pulverulent chlorine dioxide compositions to many of the applications of the liquid chlorine dioxide-yielding solutions.

SUMMARY OF THE INVENTION

Accordingly, a primary object of the present invention is to provide a substantially dry puverulent chlorine dioxide-yielding composition without a need for water-activation so as to be suitable for such applications as the preservation of fruits and vegetables for shipping without incurring the problems of storage, activation, and application mentioned above.

Other and further objects, advantages, and novel features of the present invention will be apparent from the following more detailed description.

The objects of the present invention are attained by providing a basic-reacting adsorbent having adsorbed thereon a small but effective amount of complexed or stabilized chlorine dioxide contained in aqueous liquid which is adapted to release gaseous chlorine dioxide upon acidification to a pH of less than about 6. The chlorine dioxide-yielding compositions are preferably activated by mixing them with a substantially dry acid-reacting solid.

It has been found that the aforesaid compositions are particularly useful in the preservation of fruits and vegetables for shipping or storage. When produce of this kind is packaged in containers or placed in closed compartments for shipment, a quantity of the dry chlorine dioxide-yielding powder can be placed in the container or compartment in such a manner that small amounts of gaseous chlorine dioxide are released during the time involved in shipment or storage. The presence of a small amount of chlorine dioxide gas in the air in the container or compartment kills bacteria and prevents fungus growth without leaving residue on the fruit or vegetable.

Further, these dry chlorine dioxide-yielding compositions can serve as deodorizers. When the pulverulent solid compositions are placed on waste materials of acid nature, the natural acidity of the waste activates a release of chlorine dioxide which will oxidize malodors such as hydrogen sulfide, phenols, mercaptans, ammonia, and other oxidizable materials emanating from waste.

DESCRIPTION OF PREFERRED EMBODIMENTS

The substantially dry chlorine dioxide-yielding composition of the present invention is made by adsorbing on a basic reacting adsorbent a stabilized aqueous solution of complexed chlorine dioxide which will release the gaseous chlorine dioxide upon acidification. The solutions which will yield chlorine dioxide upon acidification may be, as previously has been indicated, solutions of stabilized chlorine dioxide such as chlorine dioxide solutions stabilized with sodium carbonate peroxide or sodium percarbonate, or solutions such as alkaline chlorite solutions.

Stabilized chlorine dioxide solutions comprise aqueous solutions of reaction products of chlorine dioxide with alkaline peroxygen compounds. The alkaline peroxygen compounds form a complex with the dissolved chlorine dioxide and thus give a more stable solution which has a longer shelf life as well as a solution containing a greater concentration of chlorine dioxide than can be held in solution in the absence of a peroxygen compound. Stabilized chlorine dioxide solutions of the kind disclosed and claimed in the aforementioned U.S. Pat. 3,123,521 are especially suitable for use as the chlorine dioxide-yielding solution which is adsorbed on the basic-reacting adsorbent.

Further, aqueous solutions of chlorine dioxide stabilized with other alkaline peroxygen compounds are also suitable including those stabilized or complexed with hydrogen peroxide and an alkali or alkali salt such as an alkali metal bicarbonate, or an alkaline peroxygen compound such as sodium peroxide or sodium perborate. Generally speaking, when a sodium peroxygen compound is referred to as being useful herein, the corresponding salts of potassium or lithium may be used as well.

Solutions of the stabilized or complexed chlorine dioxide may be prepared by dissolving the alkali metal peroxygen compound or compounds in water to form an aqueous solution containing about 5 to 15%, and preferably 10 to 13%, by weight, of the peroxygen compound, and then bubbling chlorine dioxide gas through the aqueous solution, preferably until at least about 40,000 p.p.m., and preferably between 50,000 and 70,000 p.p.m., of chlorine dioxide is adsorbed therein. For stability, the solution is best maintained at a pH value above about 8, preferably between about 8.5 and 9.0.

In general, the chlorine dioxide gas which is to be used in the stabilized solution should preferably be purified to remove traces of free chlorine. There are several well known techniques for accomplishing this separation. Chlorine gas is objectionable since, in aqueous solution, chlorine forms hypochlorous acid. Chlorine has a very sharp odor in concentrations as low as 3.5 parts per million. It is also extremely corrosive.

The alkali metal peroxygen stabilizing compounds are well known. The preferred ones include sodium carbonate peroxide or hydrogen peroxide with alkaline carbonates and bicarbonates, but alkali metal perborates may also be used if the toxicity imparted by the perborates is not objectionable.

Also useful in carrying the present invention into effect are aqueous solutions of chlorites, particularly the alkali metal and alkaline earth chlorites, with sodium chlorite preferred. These solutions are well known and are made by dissolving an appropriate chlorite in water, and then adjusting the pH to above about 8, preferably between about 8.5 to 9.0, with an appropriate alkaline compound such as sodium bicarbonate. The chlorite can be present in the aqueous solution in amounts of about .001 to 25 weight percent, and more preferably in amounts of about .01 to 6 weight percent.

The basic-reacting adsorbent should be one which is capable of adsorbing a considerable amount of stabilized or complexed chlorine dioxide solution and yet preferably retain the characteristics of a dry solid or powder. Further, the solid pulverulent adsorbent should be one which has a basic pH, i.e., above about 8, preferably 8.5 to 9.0, so as to prevent premature decomposition of the adsorbed solution and, thus, liberation of chlorine dioxide.

Preferred basic-reacting adsorbents will have a high adsorptive capacity, for example, an adsorptive capacity of at least about 50 weight percent water, and more preferably above about 75 to 200 percent and higher, e.g., 560 percent. The adsorbents should also have a large surface area, preferably above about 90 and up to about 200 square meters per gram, e.g., about 95 to 150 square meters per gram, and a finely divided particle size corresponding to an average particle diameter of up to 10 microns, preferably between about 1.5 to 5 microns.

The preferred basic-reacting adsorbents should have the above characteristics and can include the synthetic calcium silicates, particulate silicas, talc, diatomaceous earth, charcoal, clays, volcanic ash, and the like. When using those adsorbents which are normally acidic, it is necessary to adjust the pH to at least about 8, preferably 8.5 to 9.0, with alkaline materials such as sodium hydroxide, sodium carbonate and sodium bicarbonate.

Therefore, to eliminate the problems of pH adjustment, it is preferred to use those adsorbents which normally have a pH above 8.

A synthetic calcium silicate having a pH of 8.3 to 8.6 and sold by the Johns Manville Corporation under the trademark Microcel E has been found to be particularly suitable.

The substantially dry pulverulent solid composition can then be prepared by thoroughly mixing an effective amount of stabilized or complexed chlorine dioxide solution with the basic-reacting adsorbent, so that, for example, about 100 to 60,000 p.p.m., and preferably about 5,000 to 50,000 p.p.m. dissolved chlorine dioxide will be adsorbed thereon.

For example, stabilized chlorine dioxide solution having about 50,000 p.p.m. chlorine dioxide dissolved therein can be mixed in weight ratios of about 3:2 with synthetic calcium silicate by spraying a fine mist of chlorine dioxide solution onto the silicate being vigorously agitated.

This substantially dry powder can then be acid-activated to yield chlorine dioxide. Acidification is preferably carried out by adding thereto, such as by mixing therewith, a solid acidic powder.

The solid acidic powder should have a pH below about 6, preferably between about 2 and 6, and can be mixed in weight ratios of about 1:100 to 100:1, preferably about 1:10 to 10:1, with the powder containing the chlorine dioxide solution.

The solid acidic powder may be, perhaps preferably, an acid-reacting adsorbent. Such adsorbents include normally acidic adsorbents, for example, silica and talc, and normally basic adsorbents which can be made acidic, e.g., the previously mentioned synthetic silicates, on which is adsorbed an aqueous solution of an acidic salt, such as ferric chloride, aluminum chloride, or a hydrogen ion-yielding acid such as hydrochloric, sulfuric or phosphoric aicd.

For example, an aqueous solution containing ferric chloride in an amount of about 30 to 40 weight percent can be adsorbed on synthetic calcium silicate in amounts of about 1 to 60%, and then mixed in ratios of about 1:100 to 100:1, preferably 1:10 to 10:1, with the powder containing the stabilized or complexed chlorine dioxide. The rate of the release of chlorine dioxide can be controlled by the amount of the acidic material added to the powder which contains the latent chlorine dioxide, or the strength of the acidic material.

Other suitable solid acidic powders include powdered citric acid which is physiologically acceptable, and solid acid salts, such as ferric chloride, aluminum chloride, aluminum sulfate, and ferric sulfate powder. These solid acidic powders should be, preferably, wholly or partially hydrated to give particularly enhanced results, e.g., fast release of gaseous chlorine dioxide, when mixed with the chlorine dioxide-yielding powder.

The above described chlorine dioxide-yielding compositions can also be used as a waste-activated deodorizer. Thus, when the chlorine dioxide-yielding powder is placed on waste materials of an acid nature, the natural acidity of the waste activates a release of chlorine dioxide which will oxidize malodors such as hydrogen sulfide, phenols, mercaptans, ammonia and other oxidizable material in or emanating from waste materials.

The compositions of the present invention are also useful in the preservation of fruits and vegetables for shipping or storage. A method of protecting these products from attack by fungi and the like is possible by storing them in a closed space in the presence of acidified pulverulent chlorine dioxide mixtures made in accordance with the present reaction. These mixtures should be present in quantities such that chlorine dioxide gas in the amount of about .001 to 1%, based on the volume of free space, is capable of being liberated to kill bacteria and prevent fungus growth without leaving a residue on the fruit or vegetable. In many cases it is advantageous to place the ClO₂ containing adsorbent in containers at an early stage of a packaging operation and to activate it by addition of the acid only after completion of the packaging operation, just before such containers are sealed.

If desired, the pulverulent compositions of the present invention can be shaped into tablets, briquettes, and the like such as by combining under pressure with a suitable binder, e.g., an alkaline starch.

The present invention is further illustrated by the following examples wherein all parts and percentages are by weight unless otherwise stated.

EXAMPLE I

A stabilized chlorine dioxide solution is prepared by dissolving powdered sodium carbonate peroxide in water to form a 10% solution. The stabilizing compound, sodium carbonate peroxide, is an addition compound of sodium carbonate and hydrogen peroxide, approximately corresponding to the formula $2Na_2CO_3 \cdot 3H_2O_2$. This compound as available commercially is a white powder containing 14% active oxygen and 29% hydrogen peroxide. Its solubility in water at 20° C. is 13.3%. In powdered form, this compound is relatively stable. Solutions of sodium carbonate peroxide in water have characteristics similar to a solution prepared by separately dissolving hydrogen peroxide and sodium carbonate in water. The former solution, however, is more stable.

Chlorine dioxide which contains substantially no free chlorine is then bubbled through the solution of sodium carbonate peroxide until approximately 6 mg. of gaseous chlorine dioxide is taken up per gram dry weight of sodium carbonate peroxide. A stabilized chlorine dioxide solution prepared in accordance with this method contains about 50,000 p.p.m. of dissolved chlorine dioxide at a pH value between 8.0 and 8.6.

This solution is then mixed in a 1:1 ratio with a synthetic calcium silicate powder of pH 8.3 to 8.6, sold under the trademark Microcel E by Johns Manville Corporation, so as to absorb this solution on the adsorbent.

This substantially dry pulverulent solid composition is then acidified by mixing it with powdered citric acid having a pH of 2 in a ratio of 1:1.

About 2 grams of this mixture is then placed in an open dish inside a standard corrugated paper container containing bananas for shipment, and the container is sealed. Bananas packed in such a container will be effectively protected against the action of fungi even during an extended sea voyage.

EXAMPLE II

A complexed chlorine dioxide solution is prepared by dissolving sodium chlorite in water to obtain a 6% solution which is then adjusted to a pH of 8.5 by the addition of sodium bicarbonate.

The above solution is then adsorbed on synthetic calcium silicate powder in a ratio of 1:1.

The above composition is then acidified by mixing it in a ratio of 1:1 with a solid acid-reacting material prepared by adsorbing a 30% ferric chloride solution on synthetic calcium silicate in a ratio of 1:1.

The above acidified mixture is then placed in the vicinity of toilets to counteract malodors therefrom.

EXAMPLES III–VI

In the following examples solid acidic powders in hydrated form are mixed in varying ratios with synthetic calcium silicate having adsorbed thereon 2.5% dissolved chlorine dioxide. The silicate-chlorine dioxide composition was prepared by mixing the silicate in a 1:1 ratio with a solution having 50,000 p.p.m. chlorine dioxide dissolved therein and stabilized with sodium carbonate peroxide, as in Example I.

| Example | Acidic powder | Ratio¹ | Amount of chlorine-dioxide gas released, p.p.m. | Time, min. |
|---------|---------------|--------|-------------------------------------------------|------------|
| III     | Ferric chloride | 3:4 | 14,000 | 10 |
| IV      | do            | 3:4    | 18,000 | 30 |
| V       | do            | 1:1    | 14,500 | 30 |
| VI      | Aluminum chloride | 4:3 | 25,000 | 10 |

¹ Chlorine dioxide-containing powder to acidic powder.

The amount of chlorine dioxide gas released was determined by capturing the gas evolved from the mixture and then analyzing it by photo-spectrometer methods.

While the invention has been described in preferred embodiments, variations and changes may be made therein without departing from the invention as set forth in the following claims.

I claim:
1. A pulverulent solid oxidizing composition comprising:
    (i) a finely divided adsorbent selected from the class consisting of calcium silicate, particulate silicas, talc, diatomaceous earth, charcoal and volcanic ash, said adsorbent being characterized by a pH of at least 8, a surface area of between 90 and 200 square meters per gram, and an adsorptive capacity of at least 50 percent by weight of water; and
    (ii) uniformly adsorbed on said adsorbent an aqueous solution having a pH of at least 8 and containing 0.01 to 6 percent by weight of an alkali metal chlorite or of an alkaline earth metal chlorite, said solution being adsorbed on said adsorbent in proportion equal to 100 to 60,000 p.p.m. of chlorine dioxide based on the weight of said adsorbent.

2. A pulverulent oxidizing composition according to claim 1 wherein the absorbed chlorite solution has a pH of between 8 and 9 and contains chlorine dioxide in a concentration of at least 40,000 p.p.m.

3. A pulverulent oxidizing composition according to claim 2 wherein the solid adsorbent has a pH of between 8 and 9 and the adsorbed chlorite solution is a solution containing chlorine dioxide stabilized with an alkaline peroxygen compound.

4. A pulverulent solid oxidizing composition comprising:
    (i) a finely divided synthetic calcium silicate powder which is characterized by a pH of between 8 and 9, a surface area of between 90 and 200 square meters per gram and an adsorptive capacity of at least 50 percent by weight of water; and
    (ii) uniformly adsorbed on said silicate powder an aqueous solution having a pH of at least 8 and containing 0.01 to 6 percent by weight of an alkali metal chlorite or of an alkaline earth metal chlorite, said solution being adsorbed on said silicate powder in a proportion equal to 100 to 60,000 p.p.m. of chlorine dioxide based on the weight of said silicate powder.

5. A pulverulent oxidizing composition according to claim 4 wherein the silicate powder has a pH of between 8 and 9 and an adsorptive capacity of about 75 to 560 percent by weight of water.

6. A pulverulent oxidizing composition according to claim 5 wherein the aqueous chlorite solution which is adsorbed on said silicate powder is a solution containing chlorine dioxide dissolved therein in a concentration of at least 40,000 p.p.m. and stabilized with an alkaline peroxygen compound.

7. A pulverulent oxidizing composition according to claim 5 wherein the aqueous chlorite solution which is adsorbed on said silicate powder is a stabilized chlorine dioxide solution containing sodium carbonate peroxide in a concentration of between about 10 and 13 percent as a stabilizer for the chlorine dioxide which is dissolved therein.

8. A pulverulent oxidizing composition according to claim 5 wherein the aqueous chlorite solution is adsorbed on said silicate powder in a proportion equal to between about 5,000 and 50,000 p.p.m. chlorine dioxide based on the weight of the silicate powder.

References Cited

UNITED STATES PATENTS

| | | | |
|---|---|---|---|
| 2,071,094 | 2/1937 | Vincent | 424—149 |
| 3,183,057 | 5/1965 | Marks et al. | 99—154 |
| 3,271,242 | 9/1966 | McNicholas | 424—76 |

ALBERT T. MEYERS, Primary Examiner

N. A. DREZIN, Assistant Examiner

U.S. Cl. X.R.

99—154; 424—76, 130, 149, 156